Sept. 19, 1933.　　　　J. F. POWELL　　　　1,927,046
CLUTCH DEVICE
Filed Nov. 27, 1931
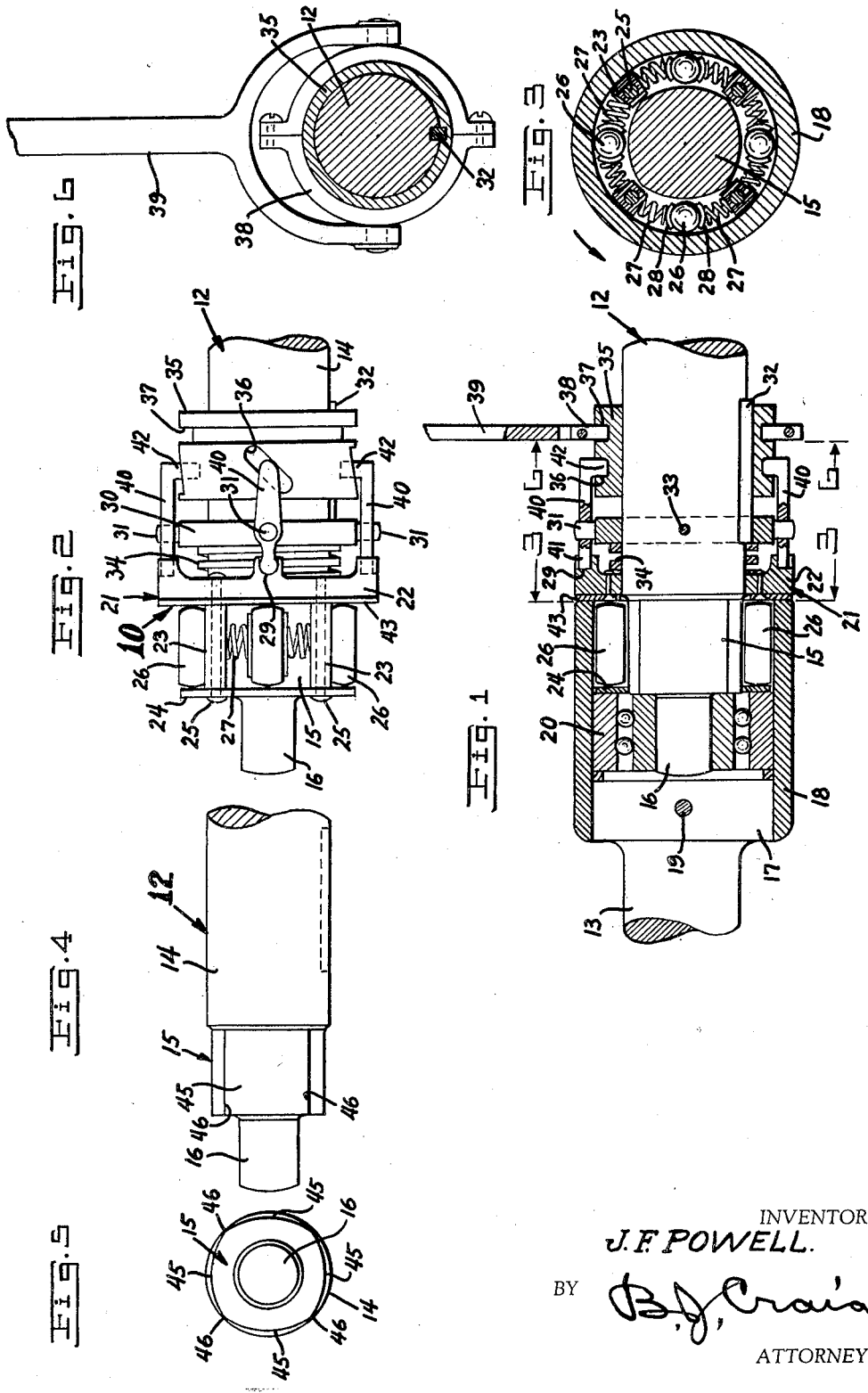
INVENTOR.
J. F. POWELL.
BY B. J. Craig,
ATTORNEY.

Patented Sept. 19, 1933

1,927,046

UNITED STATES PATENT OFFICE 1,927,046

CLUTCH DEVICE

Joseph F. Powell, Los Angeles, Calif., assignor of one-half to Lester H. Miles, Los Angeles, Calif.

Application November 27, 1931
Serial No. 577,483

5 Claims. (Cl. 192—44)

This invention relates to improvements in clutch mechanisms.

The general object of the invention is to provide an improved overrunning clutch.

Another object of the invention is to provide a two-way overrunning clutch.

Other objects and advantages of this invention will be apparent from the following description taken in connection with the accompanying drawing wherein:

Fig. 1 is a central longitudinal section through my improved clutch mechanism showing it operatively connecting a driving member and a driven member.

Fig. 2 is a side elevation of the clutch mechanism.

Fig. 3 is a section taken on line 3—3 of Fig. 1.

Fig. 4 is a fragmentary elevation of the driven shaft.

Fig. 5 is an end view of the driven shaft, and

Fig. 6 is a section taken on line 6—6 of Fig. 1.

Referring to the drawing by reference characters I have indicated my improved clutch mechanism generally at 10. As shown the clutch 10 is adapted to operatively connect a shaft 12 to a drive shaft 13. The shaft 12 includes an annular portion 14, a reduced cam portion 15 and a reduced annular end portion 16.

The drive shaft 13 is shown as provided with an enlarged head 17 which is secured to a sleeve 18 by a pin 19. Positioned in the sleeve 18 I provide an antifriction bearing 20, the outer raceway of which engages the inner face of the sleeve 18 and the inner raceway of which is positioned on the reduced end portion 16 of the driven shaft 12.

Adjacent the juncture of the cam portion 15 and the large annular portion 14 of the shaft 12 I provide a clutch roller cage 21. The cage 21 includes a collar 22 which is loosely mounted on the annular portion 14 of the shaft 12. Extending from the collar 21 towards the reduced end of the shaft I provide a plurality of spacer bars 23 which engage a washer 24. The bars 23 and the washer 24 are secured to the collar 22 by rivets 25.

Positioned intermediate each of the bars 23 I provide a roller 26 which is retained in an intermediate position by a pair of coiled springs 27. One end of each of the springs 27 engages one of the posts or bars 23 and the other end engages a plate 28 which is shaped to conform to the shape of the roller which it engages. In the face of the collar 22 opposite the bars 23 I provide a plurality of recesses 29.

Spaced from the collar 22 I provide a collar 30 which includes a plurality of radially projecting pivot members 31. The collar 30 is shown as secured to the shaft 12 by a key 32 and by a pin 33 which prevents axial movement of the collar 30. Positioned between the collar 30 and the collar 22 and surrounding the shaft 12 I provide a coiled spring 34 which urges the collar 22 away from the collar 30.

Positioned on the shaft portion 14 and spaced from the collar 30 I provide a shifting spool 35 which is free to move axially on the shaft but is connected to the shaft for rotation therewith by the key 32. In the peripheral face of the spool 35 I provide a plurality of diagonal recesses 36 and an annular groove 37 in which a collar portion 38 of a shifting device 39 is positioned.

Positioned on each of the pivot members 31 of the collar 30 I provide a finger 40 which includes an end portion 41 which is positioned in one of the recesses 29 of the collar 22. On the opposite end of the finger 40 I provide an inwardly projecting portion 42 which is positioned in one of the diagonal recesses 36 of the shifting spool 35.

From the foregoing it will be apparent that when the shifting spool is moved axially on the shaft 12 the diagonal recesses 36 will cause the fingers 40 to swing about the axis of the pivot members 31 and thereby shift the collar 22 about the axis of the shaft 12.

When the clutch mechanism is operatively assembled I preferably provide a wear plate 43 which is secured to the collar 22 between the collar and the end of the sleeve 18.

The cam portion 15 of the shaft 12 includes a plurality of arcuate reduced faces 45 which correspond in number to the number of rollers 26. In cross section the longitudinal center of the faces 45 are closer to the axis of the shaft than at the juncture of one face with another so that at the junctures high points 46 are formed.

When the cage 21 is in a normal position the axes of the rollers 26 are positioned midway of the width of their associated cam faces 45 as shown in Fig. 3. When the cage is held in this position by the shifting device 39 rotation of the drive shaft 13 and the sleeve 18 will not rotate the shaft 12. To drive the shaft 12 the shifting device 39 is left free to move, whereupon on rotation of the sleeve 18 the wear plate 43 will be rotated by the sleeve 18 and will shift the cage 21 about the axis of the shaft in the same direction as the direction of rotation of the shaft 13. That is, if the sleeve 18 is rotating to the left as indicated by the arrow in Fig. 3, the cage 21 is rotated to the left thereby moving the rollers 26 towards the high points 46. As the rollers 26 are thus moved they engage the faces 45 of their associated cam portions and become jammed between the inner surfaces of the sleeve 18 and the cam faces 45 whereupon rotation of the drive shaft and sleeve will rotate the shaft 12.

To uncouple the shaft 12 from the shaft 13 the cage 21 is rotated to the right and held in a neutral position by the shifting device 39 thereby moving the rollers 26 towards the low portions of the faces 45 whereupon continued rotation of the sleeve 18 will not rotate the shaft 12.

If the shaft 13 is reversed to drive in the opposite direction and the shifting device 39 is free to move, the reversed motion of the sleeve 18 will shift the cage 21 about the axis of the shaft 12 and jam the rollers into driving position adjacent the opposite high points of the cam portion 15 and drive the shaft 12 in the direction opposite to that previously described.

If the shifting device 39 is held immovable and the shaft 13 is reversed the sleeve 18 will not shift the cage 21 but will rotate freely without affecting the shaft 12.

Should the inertia of the object being driven by the shaft 12 tend to cause the shaft 12 to rotate faster than the sleeve 18 it may readily do so as the springs 27 will allow the rollers 26 to back away from the high points 46 slightly and rotate as the cage 21 rotates within the sleeve.

Although I have described the shaft 13 as driving the shaft 12 it will be apparent that either shaft may be the drive shaft.

From the foregoing description it will be apparent that I have provided a novel clutch mechanism which is simple in construction and highly efficient in use.

Having thus described my invention, what I claim is:

1. In a clutch device, a drive shaft, a driven shaft, a sleeve on one of said shafts, a portion of said driven shaft fitting within said sleeve, anti-friction members connecting said shafts, roller members in said sleeve, said roller members being movable to engage the inner wall of said sleeve, means to mount said roller members to rotate with one of said shafts and means including a pivoted lever to cause said roller members to engage said sleeve and the other shaft.

2. A clutch device including a drive shaft having a sleeve secured thereto, and a driven shaft, said driven shaft having a cam portion thereon, an anti-friction bearing having an outer raceway engaging the inner wall of said sleeve and having an inner raceway engaging said driven shaft, a collar secured to said driven shaft, a cage rotatable on said driven shaft, a plurality of fingers pivoted on said collar and having one end engaging said cage to move the latter, a spool slidable on said driven shaft and rotatable therewith, means to slide said spool along said driven shaft to thereby shift said cage, spaced spacer bars on said cage, roller members between said spacer bars, springs engaging said roller members and said spacer bars and serving to control the position of said roller members, said cam portion comprising low and high areas, said high areas being adapted to engage said roller members to move them against the interior of said sleeve to thereby clutch the drive and driven shafts together.

3. A clutch device including a drive shaft having a sleeve secured thereto, and a driven shaft, said driven shaft having a cam portion thereon and a reduced cylindrical portion adjacent to said cam portion, an anti-friction bearing having an outer raceway engaging the inner wall of said sleeve and having an inner raceway engaging said reduced cylindrical portion, a collar secured to said driven shaft, a cage rotatable on said driven shaft, a spool mounted to rotate with and slide along said driven shaft, a plurality of fingers pivoted on said collar and having one end engaging said cage to move the latter, coacting cam means on said fingers and said spool, means to shift said cage along said driven shaft, spaced spacer bars on said cage, roller members between said spacer bars, springs engaging said roller members and said spacer bars and serving to control the position of said roller members, said cam portion comprising low and high areas, said high areas being adapted to engage said roller members to move them against the interior of said sleeve to thereby clutch said drive and driven shafts together.

4. A clutch device including a drive shaft having an enlarged head thereon, a sleeve secured to said head, and a driven shaft, said driven shaft having a cam portion thereon and a reduced cylindrical portion adjacent to said cam portion, an anti-friction bearing having an outer raceway engaging the inner wall of said sleeve and having an inner raceway engaging said reduced cylindrical portion, a collar secured to said driven shaft, a cage rotatable on said driven shaft, a spool mounted to rotate with and slide along said driven shaft, a plurality of fingers pivoted on said collar and having one end engaging said cage to move the latter, a spring urging said cage away from said collar, coacting cam means on said fingers and said spool, means to slide said spool along said driven shaft to thereby shift said cage, said cage including a washer, spaced spacer bars on said cage, roller members between said spacer bars, springs engaging said roller members and said spacer bars and serving to control the position of said roller members, said cam portion comprising low and high areas, said high areas being normally between said roller members whereby axial movement of said spool will cause said roller members to move circumferentially to engage said high areas and whereby said roller members will engage said high areas and the interior of said sleeve to thereby clutch the drive and driven shafts together.

5. A clutch device including a drive shaft having a sleeve secured thereto, and a driven shaft, said driven shaft having a cam portion thereon, a cage about said cam portion, a plurality of rollers positioned in said cage and adapted to cause said sleeve portion to rotate with said cam portion, means to move said cage circumferentially relative to said cam portion, said means including a plurality of pivoted members and a helically slotted collar adapted to translate an axial movement of said collar into a circumferential movement of said cage whereby said rollers engage said sleeve and said cam portion to transmit motion from said drive shaft to said driven shaft.

JOSEPH F. POWELL.